United States Patent [19]

Stern et al.

[11] Patent Number: 5,712,868
[45] Date of Patent: Jan. 27, 1998

[54] DUAL MODE COMMUNICATION NETWORK

[75] Inventors: Morton Stern, Skokie; John S. Csapo, Glenview; David Edward Borth, Palatine, all of Ill.; Charles N. Lynk, Jr., Bedford, Tex.; John Richard Haug, Arlington Heights, Ill.; Eric R. Schorman, Bedford, Tex.; Phillip David Rasky, Buffalo Grove, Ill.; Walter Joseph Rozanski, Jr., Hurst, Tex.

[73] Assignee: Motorola, Inc., Schaumburg, Ill.

[21] Appl. No.: 906,785

[22] Filed: Jun. 30, 1992

[51] Int. Cl.[6] .................... H04B 7/216; H04J 13/02; H04J 13/06
[52] U.S. Cl. .................... 375/200; 375/202; 380/34
[58] Field of Search .................. 375/1, 200–210; 380/34; 455/33.1, 33.4, 49.1, 53.1, 54.1; 379/58, 59; 371/37.1, 43; 370/18, 24, 29, 53, 58.1, 77

[56] References Cited

U.S. PATENT DOCUMENTS

| | | |
|---|---|---|
| 4,267,600 | 5/1981 | Campbell .................... 455/115 |
| 5,008,953 | 4/1991 | Dahlin et al. . |
| 5,042,082 | 8/1991 | Dahlin . |
| 5,073,900 | 12/1991 | Mallinckrodt .................... 375/1 |
| 5,193,102 | 3/1993 | Meidan et al. .................... 375/202 |
| 5,283,780 | 2/1994 | Schuchman et al. .................... 370/50 |
| 5,285,469 | 2/1994 | Vanderpool .................... 375/1 |
| 5,289,272 | 2/1994 | Rabowsky et al. .................... 348/8 |
| 5,291,516 | 3/1994 | Dixon et al. .................... 375/1 |
| 5,355,161 | 10/1994 | Bird et al. .................... 348/2 |
| 5,381,443 | 1/1995 | Borth et al. .................... 375/202 |

OTHER PUBLICATIONS

Dr. John L. Fike et al., *Understanding Telephone Electronic*, pp. 6–28 through 6–35; (Howard Sams, Indianapolis; 1983).

*Primary Examiner*—Bernarr E. Gregory
*Attorney, Agent, or Firm*—Bruce Terry

[57] ABSTRACT

The dual mode communication network comprises a first communication system having a frame structure and a first traffic channel protocol and a second communication system having the frame structure and a second traffic channel protocol. In the network, only one of the first and second traffic channel protocols supports forward error correction coding.

22 Claims, 4 Drawing Sheets

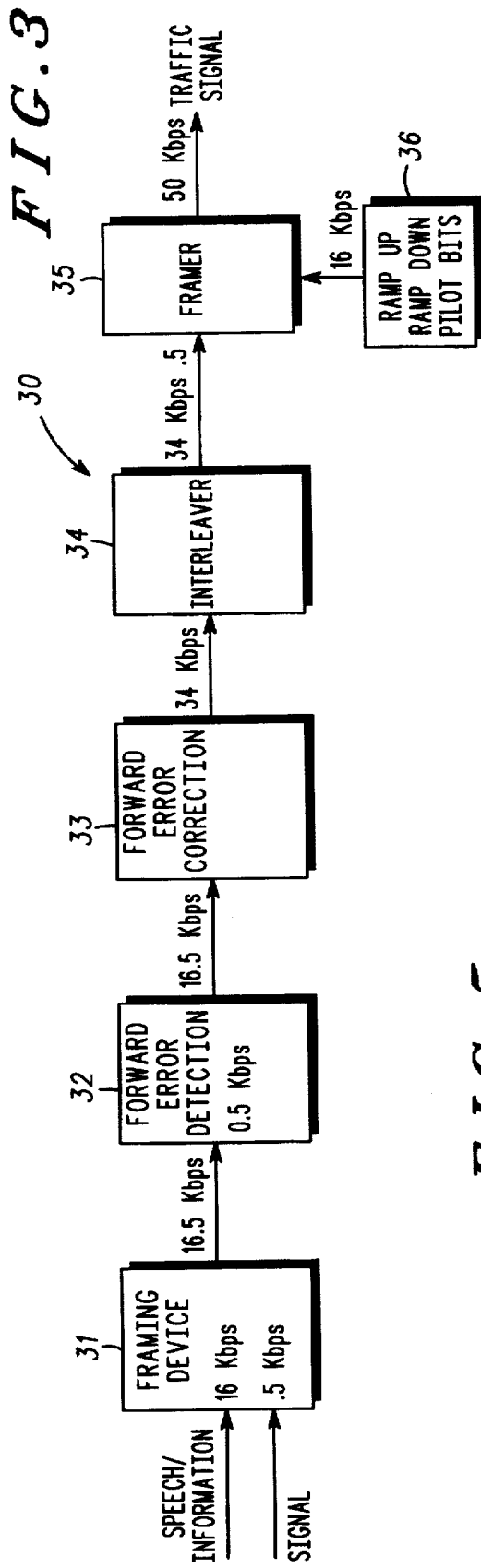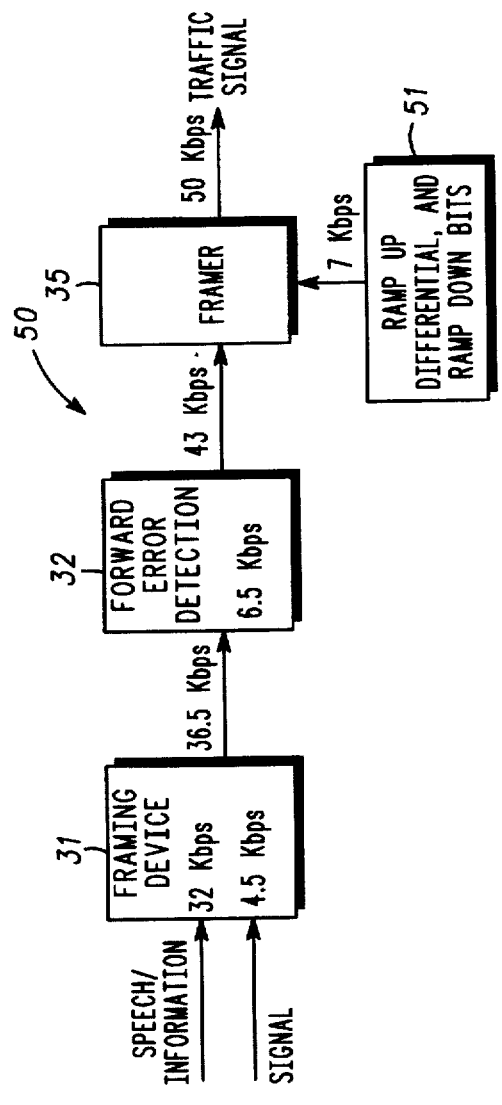

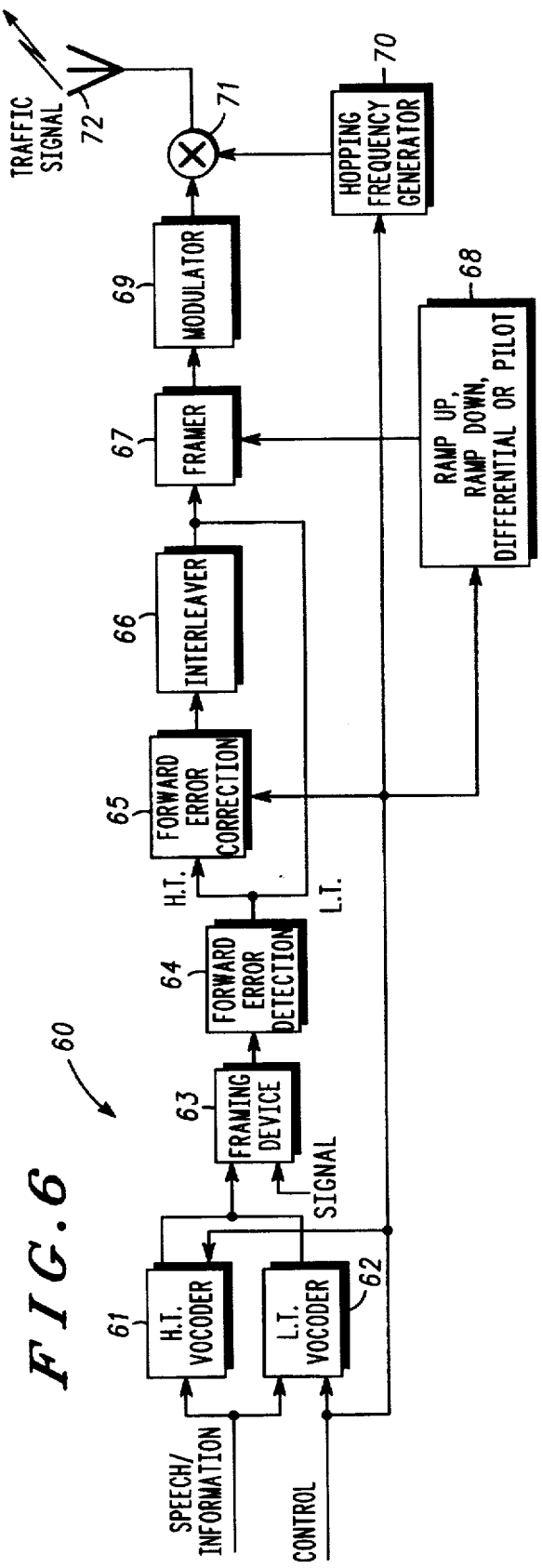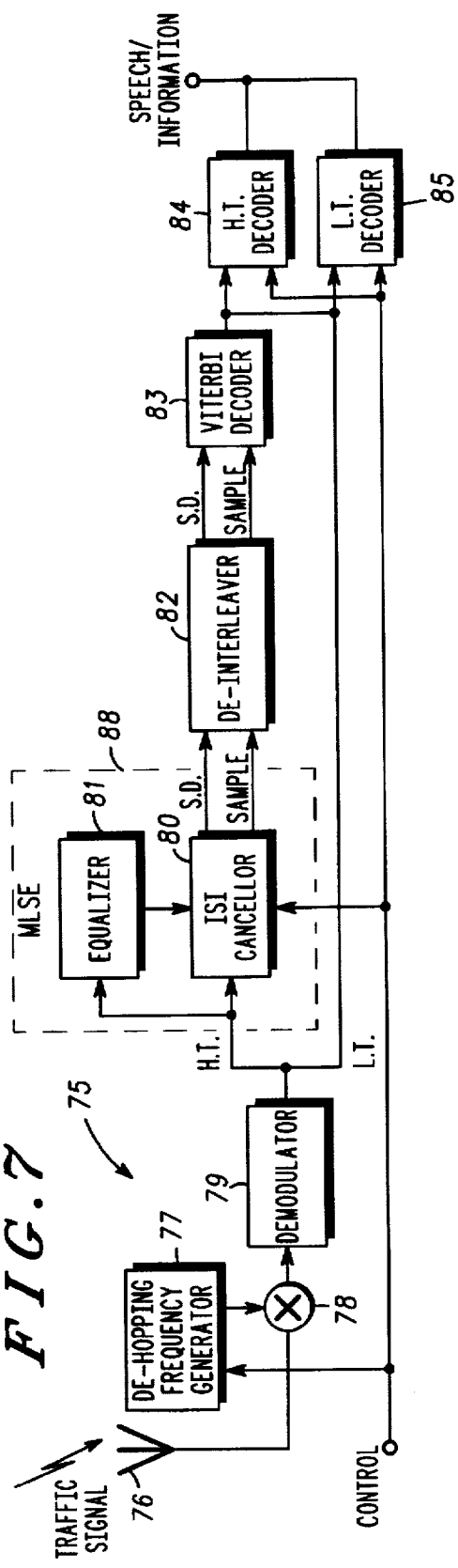

DUAL MODE COMMUNICATION NETWORK

FIELD OF THE INVENTION

The present invention relates, in general, to communication systems and, more particularly, to a dual mode communication network.

BACKGROUND OF THE INVENTION

In current cellular communication systems, pedestrian users will access the mobile cellular network. This mobile cellular network will provide the continual overhead measurements used by the system to maintain channel quality or perform hand-off functions. Since these measurements require the same amount of processing whether the user is mobile or not, a pedestrian user is charged the same fee for using their phone as the user who is mobile.

Therefore, there exists a need in the industry for a personal communication system (PCS) which would provide a low tier system for pedestrian users at a reduced cost. The low tier system would provide access via radio frequency (RF) link to a basic cellular network which may or may not provide hand-off capability. For purposes of this discussion, a pedestrian user is one who roams slowly (10 kph, kilometers per hour, or less) as opposed to a mobile (up to 100 kph or more) user.

SUMMARY OF THE INVENTION

A dual mode communication network is provided comprising a first communication system having a frame structure and a first traffic channel protocol and a second communication communication system having the same frame structure and a second traffic channel protocol. In the network, only one of the first and second traffic channel protocols supports forward error correction coding.

BRIEF DESCRIPTION OF THE DRAWINGS

FIG. 3 is a block diagram illustrating the operation of a high tier modem embodying the present invention;

FIG. 5 is a block diagram illustrating the operation of a low tier modem embodying the present invention;

FIG. 6 is a block diagram of the transmit side of a modem embodying the present invention;

FIG. 7 is a block diagram of the receive side of a modem embodying the present invention;

DETAILED DESCRIPTION OF THE DRAWINGS

Figure 1:
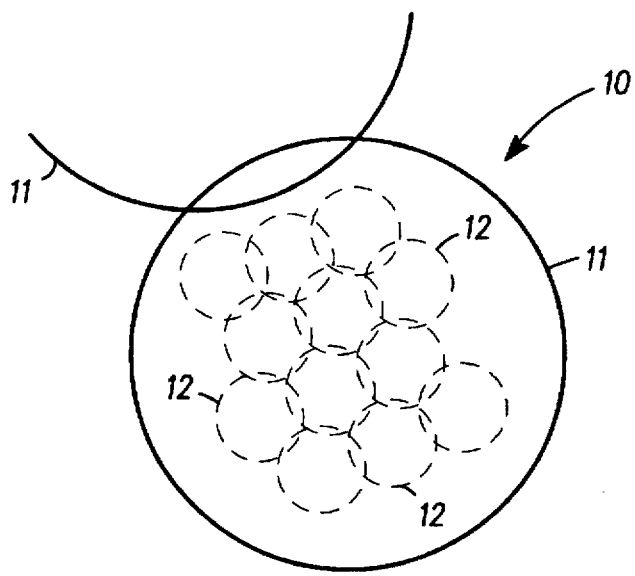
FIG. 1 is a block diagram representing a cell structure for a communication system embodying the present invention.

Referring initially to FIG. 1, a block diagram of a cell structure, generally designated 10, of a communication system embodying the present invention is illustrated. Cell structure 10 consists of a plurality of low tier cells 12 grouped in some form traffic channel of reuse pattern (21 cell, 7 cell, etc.). For purposes of this description, the term low tier denotes a communication system which, in exchange for reduced operating cost, provides a high delay performance, shorter range, and lower speed hand-off as compared to present day cellular systems. In addition to the low tier pedestrian portion of the system, there is a need to have the mobile cellular system function as a high tier portion of the PCS. For purposes of this description, the term high tier denotes a communication system which provides at least the same type of performance, range and hand-off capability as present day cellular systems. This high tier system is represented by cells 11 which, in this preferred embodiment, are in a single cell reuse pattern. The high and low tier systems function together to provide a transparent single service to the user.

An example of this is a pedestrian user who is walking down a street using an RF telephone in the low tier system. The user then, during a call, enters a vehicle and drives off. The system must be able to determine that a change has occurred and transfer the call from the low tier system to the high tier system in a fashion transparent to the user.

As an alternative, the user may desire to control the mode of the subscriber unit. To provide this, a manual switch, or soft key, is provided on the subscriber unit for the user to change between high and low tier. In the scenario provided above, when the pedestrian enters the vehicle and drives off, the call would be discontinued by the low tier system once the user reached a speed beyond the capability of the low tier system.

In a further alternative, a reduced price subscriber unit can be provided which only has low tier capability. This type of unit would be used in roaming situations (e.g. home, work, shopping, etc.); but would not function with the high tier system. A cost saving would result from the ability to eliminate various components from the subscriber unit (such as forward error correction and interleaving).

However, in order to eliminate the need to carry multiple phones, or dual mode phones, it is desirable to provide a dual mode system in which the high tier and low tier systems are compatible with each other such that a single transceiver (subscriber unit) can be utilized. Therefore, the present invention provides a dual mode system wherein the traffic channel protocols for each system operate on the same frame structure so that a single subscriber can be provided to operate at either mode.

In Table 1 below, the specifications for the traffic channels for the low tier (pedestrian) and high tier (mobile) systems are provided.

TABLE 1

| DUAL MODE TRAFFIC CHANNEL PROTOCOLS | | |
|---|---|---|
| SPECIFICATION | LOW TIER | HIGH TIER |
| SPEECH CODER | 32 kbps ADPCM | 16 kbps LD-CELP |
| Forward Error Cor. | NONE | RATE ½ |
| BIT RATE | 500 kbps | 500 kbps |
| CHANNEL SPACING | 400 KHz | 400 KHz |
| ACCESS METHOD | TDM/TDMA | SFH-CDMA |
|  | 10 SLOTS | 10 SLOTS |
| FRAME DURATION | 2 ms | 2 ms |
| TRAFFIC CHANNELS | 750 | 750 |
| MODULATION | QPSK | QPSK |
| CONTROL CHANNEL | YES, DEDICATED SLOT | YES, DEDICATED SLOT |
| DUPLEX METHOD | FREQUENCY DIVISION | FREQUENCY DIVISION |

TABLE 1-continued

DUAL MODE TRAFFIC CHANNEL PROTOCOLS

| SPECIFICATION | LOW TIER | HIGH TIER |
| --- | --- | --- |
| HAND-OFF CAPABILITY | YES | YES |
| DIVERSITY | SWITCHED ANTENNA | MAX RATIO COMBINING |
| FREQUENCY HOPPING | NO | YES |
| TX POWER (AVG) | 10 mW | 100 mW |

In the low tier (pedestrian) communication system, a traffic channel protocol using a 32 kbps (kilobits per second) ADPCM (Adaptive Delta Pulse Code Modulated) speech coder is utilized to provide toll quality calls. No error correction or equalization is required in the low tier system. In the high tier system, a 16 bit LD-CELP (Low Delay—Code Excited Linear Predictive) speech coder is used with a rate ½ forward error correction (FEC). However, a 32 kbps ADPCM using two slots per frame or an 8 kbps coder using one slot in every other frame would also provide acceptable high tier coding alternatives.

Figure 2:
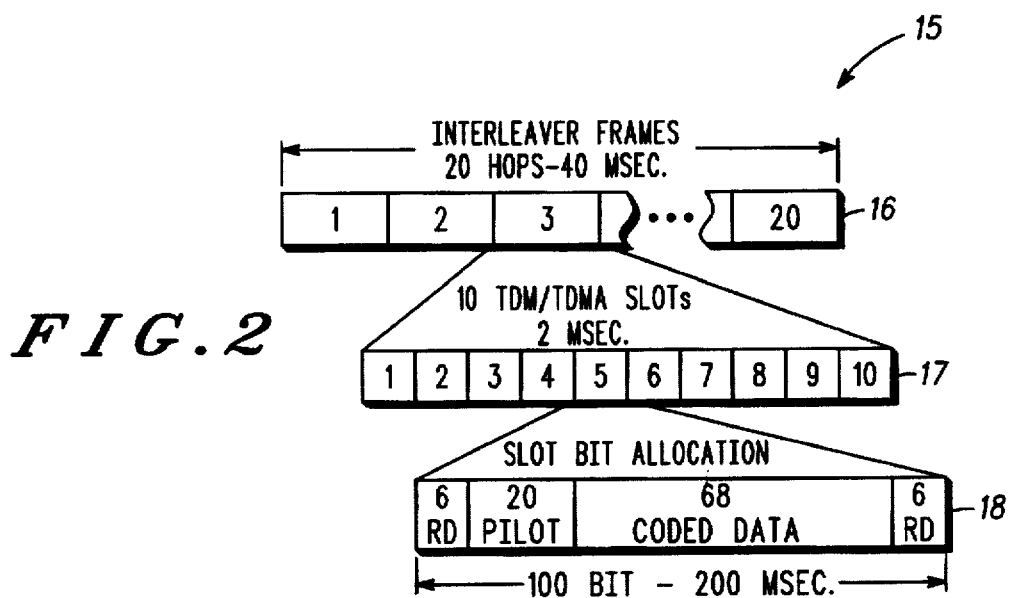
FIG. 2 is a frame structure for a low tier communication system embodying the present invention.

As can be seen from TABLE 1, and as illustrated in FIG. 2, the frame, generally designated 15, for the high tier system is a 20 hop interleaver frame 16. Each hop consists of a 10 slot TDMA (Time Division Multiple Access) frame 17. Each TDMA frame consists of 100 bits which consists of 6 ramp up bits, 20 pilot bits, 68 coded data bits (speech bits), and 6 ramp down bits. The 68 speech bits consist of interleaved speech, FED, and signalling bits. Each slot is 200 μsec (microseconds) long. This results in a TDMA frame being 2 msec (milliseconds) and the interleaver frame being 40 msec. Since this protocol utilizes both slow frequency hopping code division multiple access (CDMA) (i.e. the hopping sequence) combined with a time division multiple access method (TDMA) (multiple slot configuration) this protocol could best be characterized as a combination CDMA/TDMA method.

A block diagram of the operation of a high tier modem, generally designated 30, is illustrated in FIG. 3. A speech/information signal is received at one input of a framing device 31 and a signalling signal is received at a second input. In the preferred embodiment the speech is received at 16 kbps and the signalling at 0.5 kbps. The output from framing device 31 is a 16.5 kbps signal. This frame is input to a forward error detection (FED) device 32 which adds an additional 0.5 kbps signal onto the 16.5 kbps signal from framer 31. The output from FED 32 is input to a forward error correction (FEC) device 33. This takes the 17 kbps input and codes it to provide a 34 kbps output signal. The 34 kbps signal is then interleaved in interleaver 34. The ramp up, pilot, and ramp down bits (16 kbps), block 36, are then added, in framer block 35, to the signal frame which provides the 50 kbps traffic channel output. This compares with the 100 bit slots provided in FIG. 2 since the frames in FIG. 2 are 2 ms each or 500 frames per second. With each frame being 100 bits, the rate calculates out to the same 50 kbps figure. Likewise, the 32 bits per frame provided for ramping and pilot bits would be 16 kbps for 500 frames per second.

Figure 4:
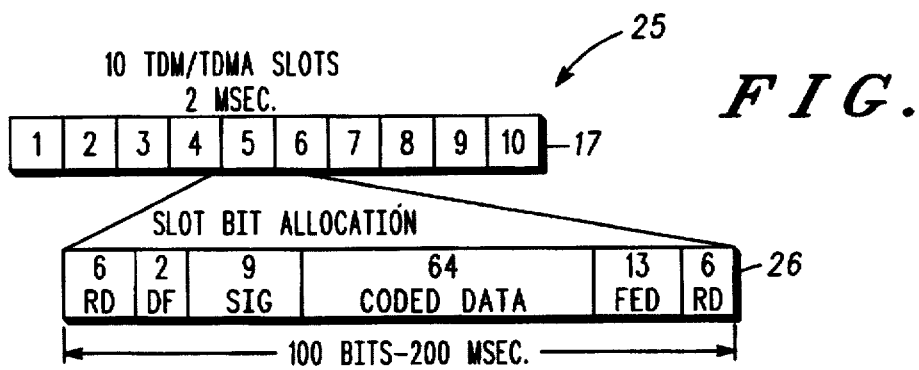
FIG. 4 is a frame structure for a high tier communication system embodying the present invention.

Referring now to FIG. 4, a low tier frame, generally designated 25, is illustrated. Since the low tier system is not hopped, there is no interleaving frame set. Therefore, the highest order frame in the low tier system is TDMA frame 17, having 10 slots. As in the high tier system, each slot contains 100 bits which consists of the 6 ramp up bits, 2 differential bits, 9 signalling bits, 64 speech bits, 13 FED bits, and 6 ramp down bits. Also, as with the high tier system, each slot has a duration of 200 μsec, making each TDMA frame 2 msec. While the transmission from the subscriber is a TDMA protocol, the transmissions from the base site may be either TDMA, where only the needed slots are used, or time division multiplexed (TDM) where all of the slots are filled whether being actively used or not. Therefore, the low tier system could be characterized as having either a TDMA or a TDM/TDMA protocol.

In FIG. 5, a block diagram of the operation of a low tier modem, generally designated 50, is illustrated. The low tier modem uses many of the same functions as the high tier modem, which may or may not operate in the same fashion. In FIG. 5, framing device 31 receives the speech signal at 32 kbps and the signalling information at 4.5 kbps. These are combined in framer 31 to form a 36.5 kbps signal. The 36.5 kbps signal is provided to FED 32 which adds 6.5 kbps for error detection. The resulting 43 kbps is added, in framer block 35, to a 7 kbps signal consisting of ramp up, differential, and ramp down bits, block 51. This results in a 50 kbps traffic signal.

As can be seen in a comparison of FIGS. 2 and 4, the low tier TDMA frame set matches the TDMA portion of the CDMA/TDMA frame set utilized by the high tier. By utilizing the same frame sets in both the high and low tier systems, a single transceiver can be designed to operate in both tiers which utilizes many of the same components, making a smaller, less expensive communication unit possible.

A block diagram of the transmit portion, generally designated 60, of a modem for use in a dual mode system is illustrated in FIG. 6. A received speech/information signal enters the modem and is presented to a high tier vocoder 61 and a low tier vocoder 62. In a preferred embodiment, high tier vocoder 61 is a 16 kbps LD-CELP vocoder and low tier vocoder 62 is a 32 kbps ADPCM vocoder. The speech signal will be processed by whichever vocoder is selected by the control input. The coded signals are then framed in framer 63 and have the forward error detection bits added in FEC 64.

If the modem is operating in the high tier system (as designated by the control signal), the framed signal has bits added for forward error correction in FED 65 and is interleaved in interleaver 66. Following interleaver 66 for the high tier, or FED 64 for the low tier, the ramp up, ramp down, and differential or pilot bits are added to the signal in framer 67. The signal is then modulated in modulator 69. The type of modulation scheme used will be a form of QPSK (Quadrature Phase Shift Keyed) modulation (such as π/4 QPSK, Offset QPSK, Differential QPSK, etc.) and, in this preferred embodiment, is a filtered QPSK, or QAM (Quadrature Amplitude Modulation), modulation. If the modem is operating in the high tier mode, it is then mixed, in mixer 71, with the hopping frequency from block 70. The signals are then output through an antenna 72.

In FIG. 7, a block diagram of the receive side, generally designated 75, of the modem is illustrated. In operation, a traffic signal is received at antenna 76. If operating in the high tier mode (as designated by the control input), the signal is mixed, in mixer 78, with a de-hopping frequency, block 77. The signal is then demodulated in block 79.

In a delay spread spectrum environment, multiple rays of a given signal will be received at different times/phases resulting from reflections of the signal from various objects (e.g. buildings, mountains). Therefore, for a modem operating in the high tier mode, the signal is provided to a Maximum Likelihood Sequence Estimator (MLSE) equalizer 81 which consists of an equalizer 81 and an InterSymbol Interference (ISI) canceller 82. Equalizer 81 looks at the sum of the whole received signal and determines where the main signal lies. The output of equalizer 81 is a set of "hard decisions", or logical 0's and 1's, which are input to canceller 80. ISI 80 takes the "hard decision" output from equalizer 81 and uses the output to eliminate the intersymbol interference from the input signal. The resulting sample signal and a set of "soft decisions" from canceller 80 are de-interleaved in de-interleaver 82 and then provided to a Viterbi decoder 83 for decoding.

Following decoder 83, or demodulator 79 if in low tier mode, the signal is decoded in the appropriate decoder 84 or 85. The speech signal is then output from the modem.

Figure 8:
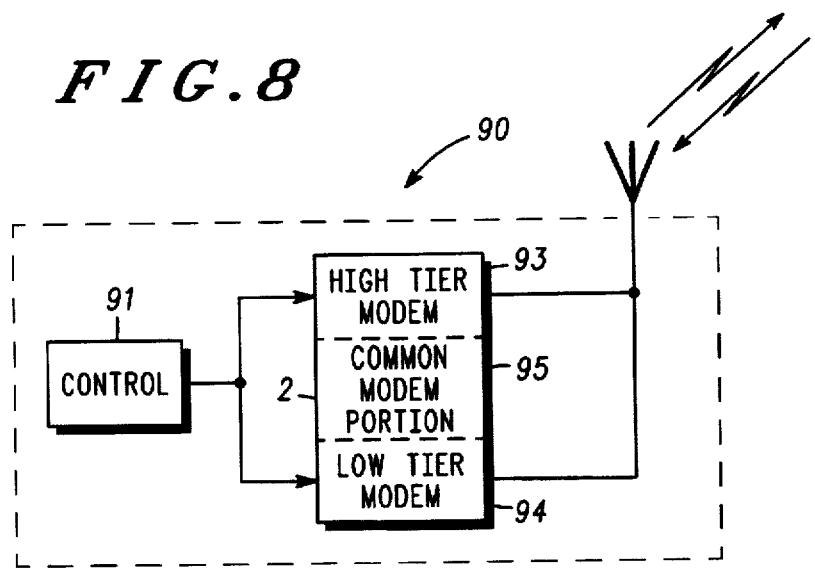
FIG. 8 is a block diagram of a modem embodying the present invention.

In FIG. 8, a general block diagram of a modem, generally designated 90, which will operate in either high tier or low tier is illustrated. Modem 90 consists of a high tier portion 93, a low tier portion 94, and a common portion 85 of components which are used in both the high and low tiers. The operation of modem 90 is controlled by a control device 90.

Control device 91 may operate based upon one or more parameters to select whether modem 90 operates in high or low tier. In one example, control device 91 may be a simple manual switch which the user controls to set modem 80 into either high tier or low tier operation. Alternatively, control device 91 may base the selection on availability of the low tier. For example, if the user is not within an area having low tier coverage (e.g. a sparsely populated area), control 91 would have to select the high tier to obtain service.

Another control parameter would be the bit error rate (BER). If the BER were excessive, control 91 would select the high tier. In another example, the user may start in the low tier mode and be transitioned, or handed-off, to the high tier mode when the users speed increased to a level where the BER was unacceptable. Measuring the carrier-to-interference (C/I) ratio would have the same effect.

Therefore, as can be seen from the likeness of the frame structures and the design of the modem to take advantage of this likeness, a system and modem have been illustrated which provide a user with the capability to operate in either a high tier mobile cellular system or a low tier pedestrian system.

Figure 9:
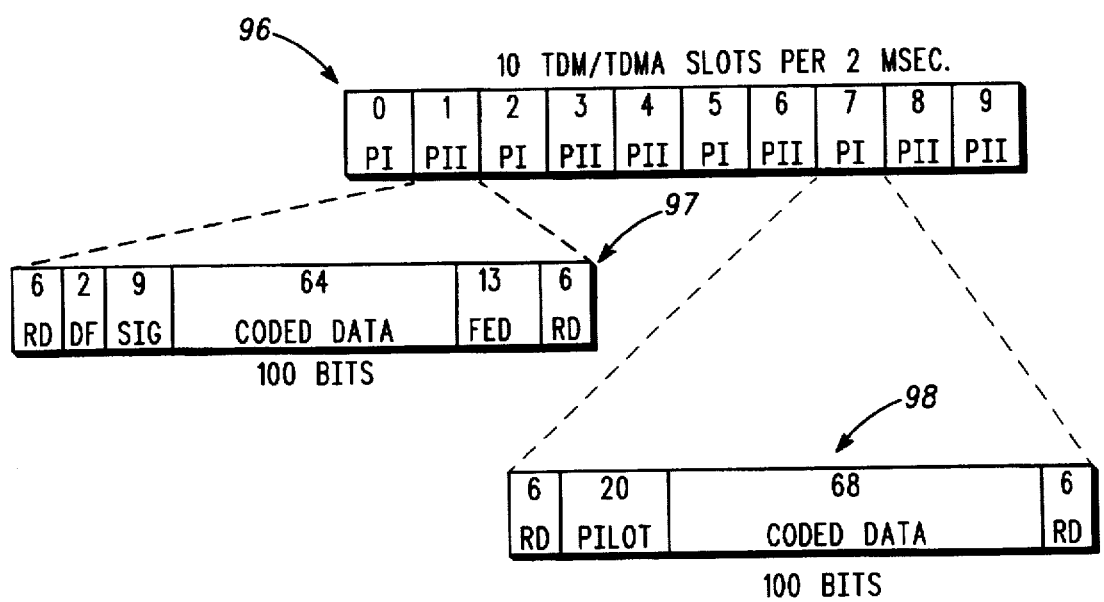
FIG. 9 is a frame structure of a combination high tier/low tier communication system embodying the present invention.

Referring now to FIG. 9, a frame structure, generally designated 96, illustrating a combination high/low tier communication system embodying the present invention is shown. Frame 96 consists of 10 slots. The data in each slot was organized using either a protocol I (PI) 98 or a protocol II (PII) 97. While only two different protocols are illustrated herein, it should be understood that as many different protocols can be utilized as there are slots. In this embodiment, the PI protocol is the high tier protocol of FIG. 2 and the PII protocol is the low tier protocol of FIG. 4. In operation, a base station would code the signals using a protocol appropriate for that user and combine the signals in the slot order desired. This type of system would use the TDM/TDMA access method.

Thus, it will be apparent to one skilled in the art that there has been provided in accordance with the invention, a dual mode communication system that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. A dual mode communication network comprising:
   a first communication system using a frame structure and a first traffic channel protocol for transmitting; and
   a second communication system using said frame structure and a second traffic channel protocol for transmitting;
   wherein only one of said first and second traffic channel protocols uses a forward error correction coding feature and a combination of a code division and a time division multiple access methods and a remaining one of said first and second traffic channel protocols utilizes a time division multiple access method.

2. The dual mode communication network of claim 1 wherein said one of said first and second traffic channel protocols which utilizes said forward error correction coding feature also utilizes an interleaving feature.

3. The dual mode communication network of claim 1 wherein both of said first and second traffic channel protocols utilize a modulation technique and a method of duplexing.

4. The dual mode communication network of claim 3 wherein said modulation technique is a QPSK modulation technique.

5. The dual mode communication network of claim 4 wherein said QPSK modulation technique is one of a QAM modulation technique, a π/4 QPSK modulation technique, an Offset QPSK modulation technique, and a Differential QPSK modulation technique.

6. The dual mode communication network of claim 3 wherein said method of duplexing is a frequency division duplexing method.

7. The dual mode communication network of claim 1 wherein said code division multiple access method is a slow frequency hopping code division multiple access method.

8. The dual mode communication network of claim 1 wherein said one of said first and second traffic channel protocols which utilizing said forward error correction coding feature also utilizes a maximum ratio combining diversity feature and a remaining one of said first and second traffic channel protocols utilizes a switched antenna diversity feature.

9. A dual mode communication network comprising:
   a first communication system using a frame structure and a first traffic channel protocol for transmitting and utilizing a vocoder rate being less than or equal to one-half of a channel rate per trunk of said frame structure; and
   a second communication system using said frame structure and a second traffic channel protocol for transmitting and utilizing a vocoder rate being greater than one-half of said channel rate per trunk of said frame structure.

10. The dual mode communication network of claim 9 wherein said frame structure comprises a plurality of slots.

11. The dual mode communication network of claim 9 wherein one of said first and second traffic channel protocols utilizing a forward error correction coding feature.

12. The dual mode communication network of claim 11 wherein said one of said first and second traffic channel protocols which utilizing said forward error correction coding feature also utilizes an interleaving feature.

13. The dual mode communication network of claim 11 wherein said one of said first and second traffic channel protocols which utilizes said forward error correction coding feature also utilizes a combination of a code division multiple access method and a time division multiple access method and a remaining one of said first and second traffic channel protocols utilizes a time division multiplexed/time division multiple access method.

14. The dual mode communication network of claim 13 wherein said code division multiple access method is a slow frequency hopping code division multiple access method.

15. The dual mode communication network of claim 11 wherein said one of said first and second traffic channel protocols which utilizes said forward error correction coding feature also maximum ratio combining diversity feature and a remaining one of said first and second traffic channel protocols utilizes a switched antenna diversity feature.

16. The dual mode communication network of claim 9 wherein both of said first and second traffic channel protocols utilize a modulation technique and a method of duplexing.

17. The dual mode communication network of claim 16 wherein said modulation technique is a QPSK modulation technique.

18. The dual mode communication network of claim 17 wherein said QPSK modulation technique is one of a QAM modulation technique, a π/4 QPSK modulation technique, an Offset QPSK modulation technique, and a Differential QPSK modulation technique.

19. The dual mode communication network of claim 16 wherein said method of duplexing is a frequency division duplexing method.

20. A dual mode communication network comprising:

a first communication system for transmitting using a frame structure and a first traffic channel protocol utilizing a vocoder rate being less than or equal to $32/100$ths of a channel rate per trunk of said frame structure; and a second communication system for transmitting using said frame structure and a second traffic channel protocol utilizing a vocoder rate being greater than or equal to $64/100$ths of said channel rate per trunk of said frame structure.

21. A dual mode communication network comprising:

a time division multiple access (TDMA) system for transmitting using a frame structure;

a combination code division multiple access (CDMA)/TDMA system for transmitting using said frame structure; and means for switching between said TDMA and said CDMA/TDMA systems.

22. The dual mode communication network of claim 21 wherein said CDMA system is a slow frequency hopping (SFH) CDMA system.

* * * * *